US006345552B1

(12) United States Patent
Röhrig et al.

(10) Patent No.: US 6,345,552 B1
(45) Date of Patent: Feb. 12, 2002

(54) SPEED-ADAPTIVE VIBRATION DAMPER

(75) Inventors: Bernhard Röhrig, Heppenheim; Hans-Gerd Eckel, Laudenbach, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/351,091

(22) Filed: Jul. 9, 1999

(30) Foreign Application Priority Data

Jul. 11, 1998 (DE) ........................................ 198 31 159

(51) Int. Cl.[7] ................................................ F16F 15/10
(52) U.S. Cl. ........................................................ 74/574
(58) Field of Search ................................ 74/573 R, 574

(56) References Cited

U.S. PATENT DOCUMENTS 1,928,119 A * 9/1933 Vargha ........................ 74/574
2,272,189 A * 2/1942 Pew ............................ 74/574
3,670,593 A * 6/1972 Troyer ......................... 74/574
3,901,101 A * 8/1975 McGavern ................... 74/574
4,962,677 A * 10/1990 Withers ....................... 74/574
5,351,574 A * 10/1994 Hiraishi et al. ............... 74/574
5,352,157 A * 10/1994 Ochs et al. ............... 74/573 R
5,452,957 A * 9/1995 Duggan .................... 74/574 X
5,884,735 A * 3/1999 Eckel et al. ............. 74/574 X
6,062,104 A * 5/2000 Allport ........................ 74/574

FOREIGN PATENT DOCUMENTS

DE 196 04 160 5/1997

* cited by examiner

*Primary Examiner*—Charles A Marmor
*Assistant Examiner*—Roger Pang
(74) *Attorney, Agent, or Firm*—Kenyon & Kenyon

(57) ABSTRACT

A speed-adaptive vibration damper for a shaft that rotates about an axis, having a hub part, on which are located a plurality of peripherally adjacent inertial masses that are movable along curved paths that increasingly approach the axis on either side of the masses. At least one relatively twistable inertial ring is elastically mounted on the hub part. When rotational vibrations set in, a change occurs in the distance of the inertial masses from the axis.

18 Claims, 3 Drawing Sheets

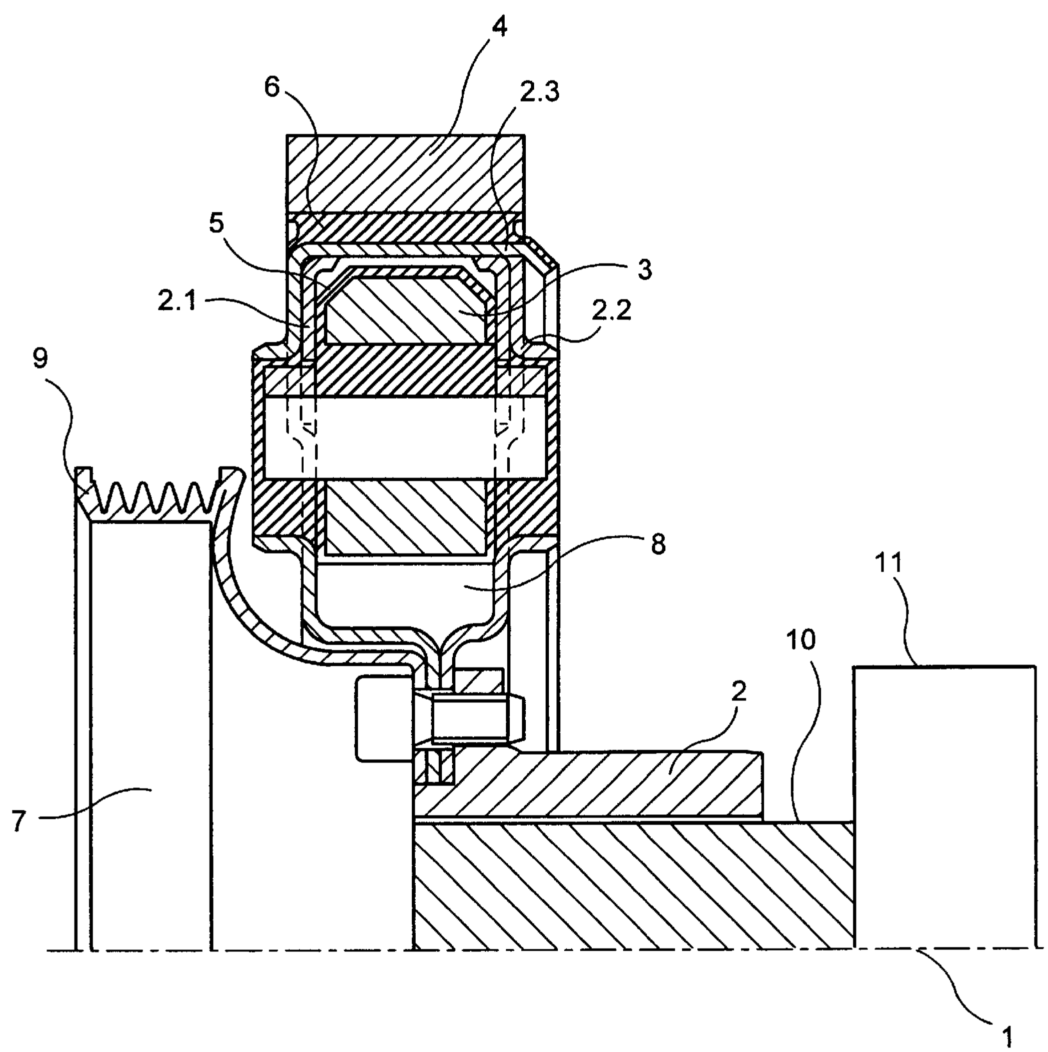
F I G. 1

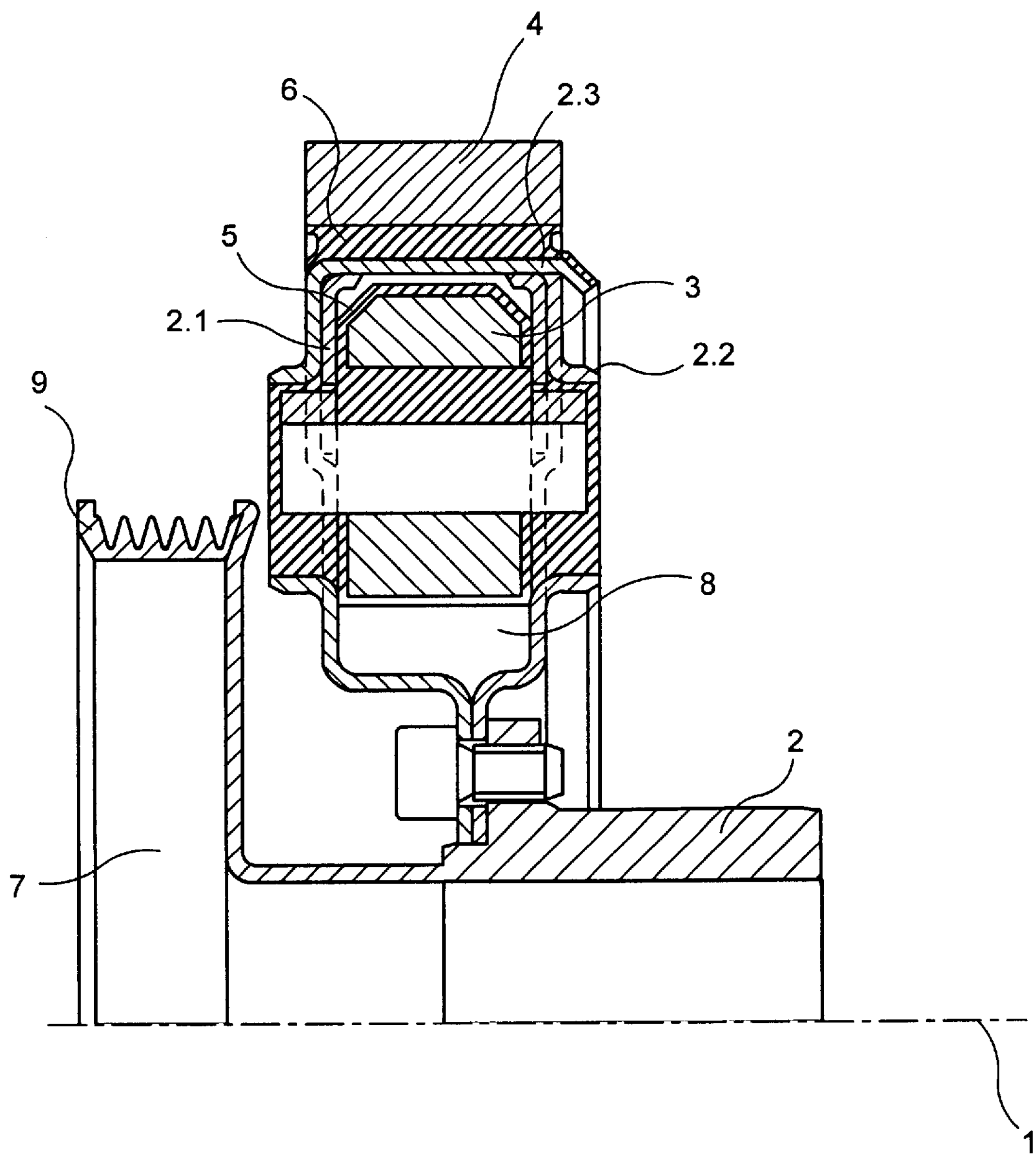
F I G. 2

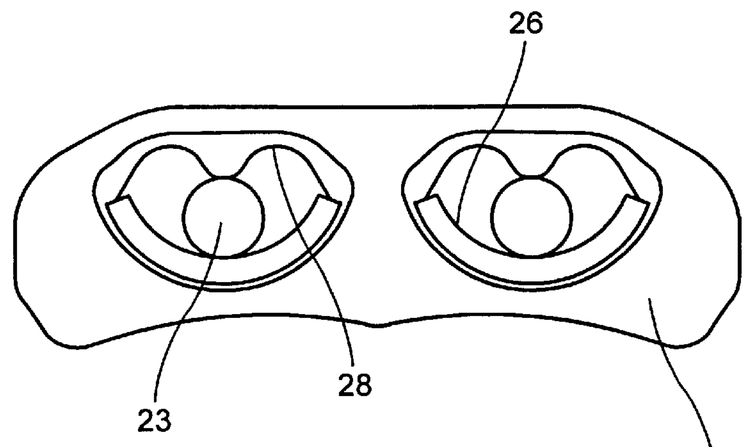
F I G. 3
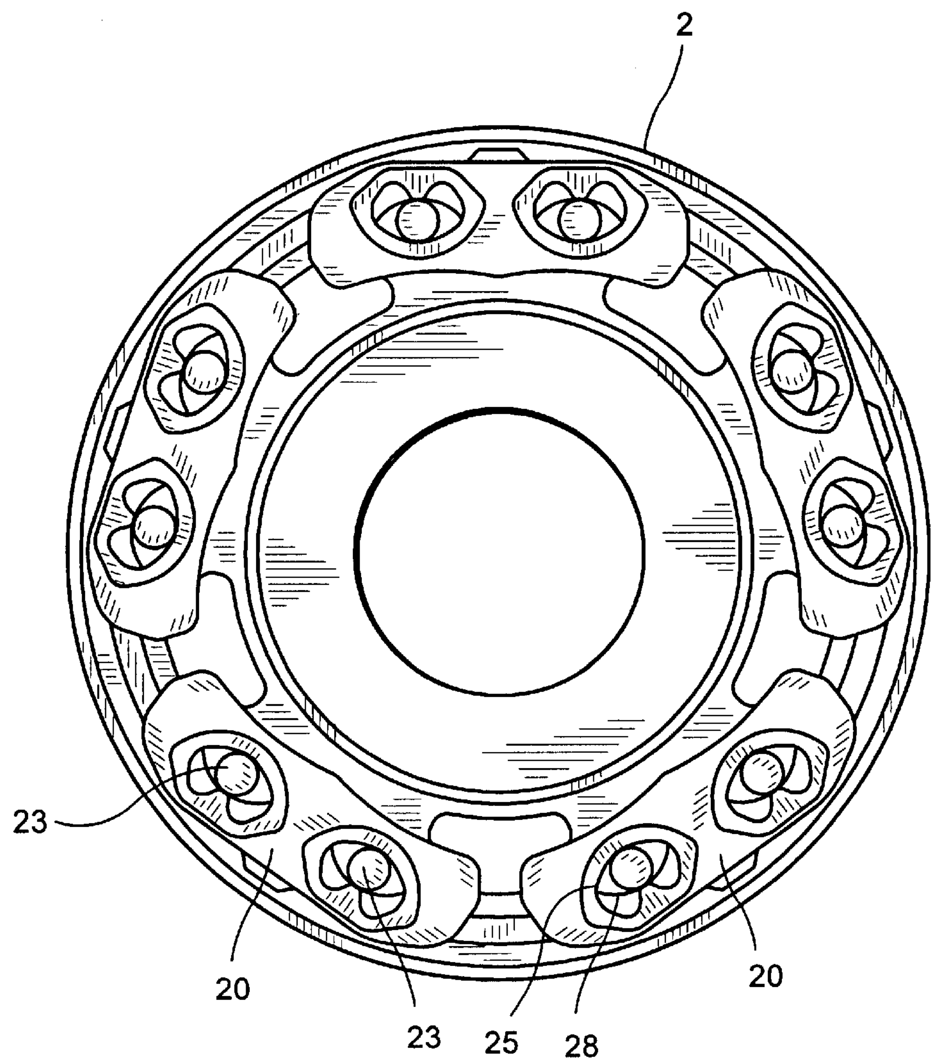
F I G. 4

SPEED-ADAPTIVE VIBRATION DAMPER

FIELD OF THE INVENTION

The invention relates to a speed-adaptive vibration damper for a shaft rotating around an axis, which includes a hub part, on which are arranged a number of peripherally adjacent inertial masses that are movable along curved paths. The masses increasingly approach the axis in the peripheral direction on both sides so that, when rotational vibrations set in, a change occurs in the distance between the inertial masses and the axis.

BACKGROUND OF THE INVENTION

Such a speed-adaptive vibration damper is known from German Patent B 196 04 160, which provides vibration damping, regardless of the instantaneous rotation speed of the rotating shaft, if a rotational vibration is superimposed on the rotational motion. The natural frequency of the damper changes in proportion to the rotation speed of the shaft and allows the vibrations, which are also proportional to the speed, to be damped. In the case of an internal combustion engine, the excitation of the ignition frequency is of the greatest amplitude and results in non-uniform rotation of the crankshaft, which is attenuated by the speed-adaptive damper.

SUMMARY OF THE INVENTION

The object of the present invention is to improve on a vibration damper of the type noted above so that an improved damping effect is achieved without negatively affecting the damping effect over a broad frequency range if the rotation vibrations superimposed on the rotary motion are of a very small amplitude.

This object is achieved in a speed-adaptive speed-adaptive vibration damper for a shaft having a hub part, on which are a number of peripherally adjacent inertial masses that are movable along curved paths that increasingly approach the axis of rotation on both sides. Consequently, when rotational vibrations set in, a change occurs in the distance of the inertial masses from the axis.

In the vibration damper according to the present invention, at least one relatively twistable inertial ring is also elastically mounted on the hub part. The damping effect of the elastically mounted inertial ring is latently present even when rotational vibrations of very small amplitudes superimposed on a rotary motion set in.

The inertial ring may surround the hub part in the radial direction; it may be advantageous to arrange the inertial ring radially outside or inside the cylindrical surface delimiting the hub part. The elastic cushion that is used may be made of an elastomeric material, for example, rubber, and, it may connect the inertial ring and the hub part onto which it is directly vulcanized. The inertial ring may also be axially adjacent to one boundary face of the hub part. The radial diameter of the vibration damper can then be reduced accordingly without impairing effectiveness. Effectiveness over a broad range can be achieved by elastically mounting a plurality of inertial rings having different resonance frequencies on the hub part.

The hub part and/or the inertial ring may include at least one belt pulley, which may be an integral part of the hub part and/or of the inertial ring.

According to an advantageous embodiment, the hub part encloses an annular chamber, where the inertial masses and/or the inertial ring are accommodated. The effect of environmental influences on the inertial masses and/or the inertial ring is thus reduced, which may substantially contribute to an increase in service life and/or reliability.

It has proven to be advantageous for improved weight/performance ratio that the hub part be designed to be as lightweight as possible and be made, at least in part, of sheet metal. The hub part may then include a first partial hub with a chamber that is open in the axial direction where the inertial masses and/or the inertial ring are introduced, and is closed by a second partial hub in the area of its axial opening. The first and second partial hubs may be connected by at least one bead, which makes it easier to achieve very low production costs while ensuring excellent dimensional stability and reliability.

One preferred application of the speed-adaptive vibration damper is its arrangement on the front or rear end of the crankshaft of cylinder engines, in particular of internal combustion engines. The damping effect achieved in this case refers to the unevenness of rotation, rotational vibrations and bending vibrations that are superimposed on the rotation motion.

The invention permits the control of vibrations of great and small amplitudes in different frequency ranges, but also of bending vibrations that are superimposed on the rotation motion and cause concentric relative displacements of the vibration damper.

BRIEF DESCRIPTION OF THE DRAWING

FIG. 1 is a partial sectional view of an embodiment of a speed-adaptive vibration constructed according to the principles of the invention.

FIG. 2 is an alternative embodiment where the belt pulley 7 is an integral part of hub part 2.

FIG. 3 illustrates the hub and inertial masses of the present invention.

FIG. 4 illustrates the inertial masses of the present invention.

DETAILED DESCRIPTION

The speed-adaptive vibration damper is intended for a shaft that is rotatable about an axis 1 and includes a hub part 2, on which a number of peripherally adjacent inertial masses 3 are movable along curved paths that increasingly approach axis 1 so that when rotational vibrations set in, a change occurs in the distance between inertial masses 3 and axis 1. The basic design may correspond to the one described in German Patent 196 04 160. (The arrangement of masses and associated curved paths are further illustrated and discussed in German Patent Application DE 19831158.3 and its associated U.S. Patent application, filed on behalf of the assignee of the instant application. These are hereby incorporated by reference for these teachings.) As seen in FIGS. 3 and 4, each inertial mass 20 is mounted in the hub part 2 using two bolts 23 that are positioned at a distance in the peripheral direction and extend in parallel to the rotation axis, the bolts 23 being rollable along curved paths having a U-shaped profile 25 open in the area of the hub part in the direction of the axis and a U-shaped profile 26 open in the opposite direction in the area of the inertial masses, the bolts being optionally guided on the sides facing away from the respective curved paths by a guide 28 in order to prevent noise from developing at the beginning and end of the rotation. In addition, in the embodiment according to the present invention, at least one relatively twistable inertial ring 4 is elastically mounted on hub part 2. Inertial ring 4 may be made of steel and manufactured from a tube section. In the illustrated embodiment, the inertial ring 4 is axially adjacent to a boundary face 5 of the hub part 2. It encloses hub part 2 at a radial distance that is spanned by an annular rubber cushion 6. Rubber cushion 6 is adhesively fixed on both sides.

Hub part 2 encloses an annular chamber 8 in which, in the embodiment illustrated in FIG. 1, only inertial masses 3 are accommodated. Hub part 2 is partly made of sheet metal. It includes a first partial hub 2.1 having a chamber 8 that is open in the axial direction, where inertial masses 3 are inserted and which is closed by a second partial hub 2.2 in the area of the axial opening, the first partial hub 2.1 and the second partial hub 2.2 being connected by a bead 2.3. In addition, belt pulley 7 with an outer grooved receptacle 9, also made of sheet metal, is attached to hub part 2. As seen in FIG. 2, the hub part 2 the belt pulley may be an integral part of the hub part 2.

In order to perform its function, upon the onset of rotational vibrations superimposed on the rotation motion, masses 3 are moved on the curved path that increasingly approach axis 1 on both sides in the peripheral direction so that a change occurs in the radial distance of inertial masses 3 from axis 1. The natural frequency of the damper changes in proportion to the rotational speed of the shaft and thus allows the vibrations that also change in proportion to the rotation speed to be damped. In an internal combustion engine, the excitation of the ignition frequency is of the greatest amplitude and results in uneven rotation of the crankshaft. The speed-adaptive damper counteracts this uneven rotation.

Hub 2, inertial ring 4 and elastic ring 6 form a torsion vibration damper. Thus torsional vibrations of the shaft, e.g., a crankshaft, can be damped. The adjustment of the torsion vibration damper is optimized depending on the torsion vibration to be damped, which does not change with the rotational speed of the shaft.

What is claimed is:

1. A speed-adaptive vibration damper for a shaft that rotates about an axis, comprising:

a hub part, a plurality of peripherally adjacent inertial masses located on the hub part, said masses being movable along curved paths such that the masses can increasingly approach the axis of the shaft either side of the masses, such that when rotational vibrations set in, a change occurs in the distance of the inertial masses from the axis; and at least one relatively twistable inertial ring that is elastically mounted on the hub part.

2. The speed-adaptive vibration damper according to claim 1, wherein the inertial ring encloses the hub part in the radial direction.

3. The speed-adaptive vibration damper according to claim 1, wherein the inertial ring is axially adjacent to a boundary face of the hub part.

4. The speed-adaptive vibration damper according to claim 1, wherein the inertial ring is attached to the hub part using at least one elastic element made of rubber.

5. The speed-adaptive vibration damper according to claim 4, wherein the inertial ring is attached to hub part by direct vulcanization.

6. The speed-adaptive vibration damper according to claim 1, further comprising at least one belt pulley attached to at least one of the hub part and the inertial ring.

7. The speed-adaptive vibration damper according to claim 2, further comprising at least one belt pulley attached to at least one of the hub part and the inertial ring.

8. The speed-adaptive vibration damper according to claim 3, further comprising at least one belt pulley attached to at least one of the hub part and the inertial ring.

9. The speed-adaptive vibration damper according to claim 6, wherein the belt pulley is an integral part of one of the hub part and the inertial ring.

10. The speed-adaptive vibration damper according to claim 1, wherein the hub part encloses an annular chamber, in which the inertial masses and/or the inertial ring are accommodated.

11. The speed-adaptive vibration damper according to claim 6, wherein the hub part encloses an annular chamber, in which the inertial masses and/or the inertial ring are accommodated.

12. The speed-adaptive vibration damper according to claim 9, wherein the hub part encloses an annular chamber, in which the inertial masses and/or the inertial ring are accommodated.

13. The speed-adaptive vibration damper according to claim 10, wherein the hub part comprises of sheet metal.

14. The speed-adaptive vibration damper according to claim 13, wherein the hub part comprises a first partial hub that has a chamber open in the axial direction, in which the inertial masses and/or the inertial ring are inserted and which is enclosed, in the area of an axial opening, by a second partial hub.

15. A speed-adaptive vibration damper for a shaft that rotates about an axis, comprising:

a hub part;

a plurality of peripherally adjacent inertial masses located on the hub part, said masses being movable along curved paths such that the masses can increasingly approach the axis of the shaft either side of the masses, such that when rotational vibrations set in, a change occurs in the distance of the inertial masses from the axis; and at least one relatively twistable inertial ring that is elastically mounted on the hub part, wherein the hub part encloses an annular chamber, in which the inertial masses and/or the inertial ring are accommodated, wherein the hub part comprises of sheet metal, wherein the hub part comprises a first partial hub that has a chamber open in the axial direction, in which the inertial masses and/or the inertial ring are inserted and which is enclosed, in the area of an axial opening, by a second partial hub, and wherein the first partial hub and the second partial hub are connected by at least one bead.

16. A system for damping the vibrations of a crank shaft, comprising:

I. a speed-adaptive vibration damper for a shaft that rotates about an axis, comprising:

a hub part;

a plurality of peripherally adjacent inertial masses located on the hub part, said masses being movable along curved paths such that the masses increasingly approach the axis of the shaft on both sides so that when rotational vibrations set in, a change occurs in the distance of the inertial masses from the axis;

at least one relatively twistable inertial ring that is elastically mounted on the hub part; and II. the crankshaft of a piston machine.

17. A system as set forth in claim 16, wherein the piston machine is an internal combustion engine.

18. A system as set forth in claim 17, wherein the vibration damper is mounted at one of a front and rear ends of the crankshaft of said internal combustion engine.

* * * * *